(12) United States Patent
Xie et al.

(10) Patent No.: US 11,938,425 B2
(45) Date of Patent: *Mar. 26, 2024

(54) MULTI-BUBBLING REGION COLUMN TRAY AND CORRESPONDING PLATE COLUMN

(71) Applicant: Beijing Zehua Chemical Engineering Co., Ltd., Beijing (CN)

(72) Inventors: Runxing Xie, Beijing (CN); Hongping Tang, Beijing (CN); Changzhi Wang, Beijing (CN)

(73) Assignee: Beijing Zehua Chemical Engineering Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,090

(22) Filed: Nov. 29, 2022

(65) Prior Publication Data

US 2023/0092008 A1    Mar. 23, 2023

Related U.S. Application Data

(63) Continuation of application No. 17/847,924, filed on Jun. 23, 2022, now Pat. No. 11,547,952.

(30) Foreign Application Priority Data

Sep. 23, 2021 (CN) .......................... 202122307016.5
Nov. 3, 2021 (CN) .......................... 202111290962.1

(51) Int. Cl.
*B01D 3/18* (2006.01)
*B01D 3/32* (2006.01)
*B01D 53/18* (2006.01)

(52) U.S. Cl.
CPC ............... *B01D 3/18* (2013.01); *B01D 3/324* (2013.01); *B01D 53/18* (2013.01)

(58) Field of Classification Search
CPC ........... B01D 3/18; B01D 3/324; B01D 53/18
See application file for complete search history.

(56) References Cited

U.S. PATENT DOCUMENTS

| | | |
|---|---|---|
| 3,045,989 A | 7/1962 | Kittel |
| 3,729,179 A | 4/1973 | Keller |
| 4,504,426 A | 3/1985 | Chuang et al. |
| 4,550,000 A | 10/1985 | Bentham |
| 5,098,615 A | 3/1992 | Resetarits |
| 5,366,666 A | 11/1994 | Chuang et al. |

(Continued)

FOREIGN PATENT DOCUMENTS

| | | |
|---|---|---|
| CN | 1400915 A | 3/2003 |
| CN | 102449119 A | 5/2012 |

(Continued)

OTHER PUBLICATIONS

Chinese Application No. 202111290962.1, First Office Action and Search Report dated Dec. 17, 2021, 12 pages.

(Continued)

*Primary Examiner* — Jonathan Miller
(74) *Attorney, Agent, or Firm* — Zhong Law LLC

(57) ABSTRACT

The present disclosure discloses a multi-bubbling region column tray and a corresponding plate column. The multi-bubbling region column tray includes: at least two bubbling regions, provided with first openings for liquid and gas to be mixed and in contact with each other; and at least one non-side downcomer, including at least one hanging downcomer, where the hanging downcomer has a bottom part which includes one or more second openings allowing the liquid to flow toward a lower left side, and one or more third openings allowing the liquid to flow toward a lower right side; and the bottom part of the hanging downcomer is designed to separate the liquid flowing out from the one or more second openings and the liquid flowing out from the one or more third openings.

21 Claims, 8 Drawing Sheets

(56) References Cited

U.S. PATENT DOCUMENTS

| | | | |
|---|---|---|---|
| 5,407,605 A | 4/1995 | Resetarits et al. | |
| 6,131,891 A | 10/2000 | Resetarits et al. | |
| 7,232,115 B2 | 6/2007 | Sastry et al. | |
| 9,919,239 B2 | 3/2018 | Xie et al. | |
| 10,012,436 B2 | 7/2018 | Chen et al. | |
| 10,183,234 B2 | 1/2019 | Blaschke et al. | |
| 10,458,703 B2 | 10/2019 | Chen et al. | |
| 10,989,471 B2 | 4/2021 | Ayaskanta et al. | |
| 11,547,952 B1 * | 1/2023 | Xie | B01D 3/225 |
| 2005/0046051 A1 | 3/2005 | Sastry | |
| 2009/0256270 A1 | 10/2009 | Griepsma | |
| 2012/0292791 A1 | 11/2012 | Headley et al. | |
| 2016/0144291 A1 | 5/2016 | Xie et al. | |
| 2017/0361242 A1 | 12/2017 | Lee et al. | |
| 2020/0011597 A1 | 1/2020 | Ayaskanta et al. | |

FOREIGN PATENT DOCUMENTS

| | | |
|---|---|---|
| CN | 103239883 A | 8/2013 |
| CN | 103239884 A | 8/2013 |
| CN | 103260717 A | 8/2013 |
| CN | 103813841 A | 5/2014 |
| DE | 2228084 A1 | 12/1973 |
| DE | 2718858 A1 | 11/1978 |
| GB | 1010403 A | 11/1965 |
| JP | H06198103 A | 7/1994 |
| WO | 2017143141 A1 | 8/2017 |

OTHER PUBLICATIONS

Chinese Application No. 202111290962.1, Second Office Action and Search Report dated Jan. 11, 2022, 22 pages.

Chinese Application No. 202111290962.1, Notice of Allowance dated Feb. 7, 2022, 1 page.

"Yan Shaofeng et al., "Process Equipment Design," Jul. 31, 2016, Northeastern University Press, 11 pages (cited in attached search reports issued in a corresponding Chinese application)".

"Zheng Xuxu et al., "Principles of Chemical Engineering (Second Edition)," Jan. 31, 2016, Huazhong University of Science and Technology Press, 15 pages (cited in attached search reports issued in a corresponding Chinese application)".

\* cited by examiner

MULTI-BUBBLING REGION COLUMN TRAY AND CORRESPONDING PLATE COLUMN

TECHNICAL FIELD

The present disclosure relates to column tray-type gas-liquid contact devices associated with chemical separation (e.g., rectification, absorption, and/or steam stripping), and in particular, to a multi-bubbling region column tray and a corresponding plate column.

BACKGROUND

Column tray-type gas-liquid (also called "vapor-liquid") contact devices associated with chemical separation (e.g., rectification, absorption, and/or steam stripping) may be applied to fields such as oil refining, petrochemical industry, chemical industry, coal chemical industry, and environmental protection. The column tray technology of chemical separation has been applied for decades, and column trays are gas-liquid contact devices that are widely applied during chemical separation such as rectification and absorption.

In a general plate column (also called "tray column" or "trayed column"), column trays (also referred to as "column plates") are used as basic components for gas-liquid contact. Gas and liquid phases flow in a crossing manner (also referred to as "a crossflow manner") on a column tray, while the gas and liquid phases in a column are operated in a reflux manner level by level. The liquid phase enters a downcomer in an overflow form before flowing onto a next column tray. Each column tray includes three parts: a downcomer, a liquid receiving tray, and a bubbling region (also called "bubbling area"). Based on the number of bubbling regions of each column tray, a column tray may be classified as a single-overflow column tray, a double overflow column tray, a three-overflow column tray, a four-overflow column tray, a six-overflow column tray, or a multi-overflow column tray.

FIG. 1 is a schematic diagram illustrating the flowing of gas and liquid phases in a three-overflow column tray (where a multi-bubbling region column tray is adopted, and 4 column trays are shown in the figure) in related art. The column trays are multi-bubbling region column trays, and each column tray includes three bubbling regions 1, a side downcomer 200 (located along a perimeter of the column tray on one or two sides of the column tray), and a non-side downcomer 300 (which may be a center downcomer located in the center of the column tray and/or a waist downcomer located at a position other than along the perimeter or at the center of the column tray). Side downcomer 200 is vertically arranged at a side position and configured to provide a channel for liquid to flow downward. Bubbling regions 1 are provided with central openings. Liquid and gas are mixed and in contact with each other in these bubbling regions, from where gas continues to move toward an upper column tray, while liquid flows downward from a downcomer on another side. Non-side downcomer 300 is a downcomer arranged at a position of the column tray that is other than the position of the side downcomer. With a conventional non-side downcomer, after liquid flows down from the downcomer, it enters bubbling regions on the left and right sides through slots located on both sides. In addition, a region located directly below the downcomer is often used to receive the liquid flowing down from the downcomer. This region is referred to as a liquid receiving tray.

FIG. 2 shows a typical non-side downcomer in the related art, which is referred to as a "hanging downcomer" (also called "truncated downcomer") and characterized in that it includes a bottom plate 400 provided with openings (elongated openings 500) for liquid to flow downward. Compared with the conventional non-side downcomer, the advantage of the hanging downcomer is that the liquid receiving tray below the downcomer may also be used as a bubbling region (the design of the liquid receiving tray is omitted in this case). In this way, the area of the bubbling region is increased, thereby improving the processing capability of the column tray.

As shown in FIG. 1, in each bubbling region 1, liquid flows downward from an upper downcomer, transversely through the bubbling region, and into a downcomer on another side after being mixed with the gas moving vertically upward. Each non-side downcomer receives liquid flowing downward from two bubbling regions 1 above the non-side downcomer, and, at the bottom of the non-side downcomer, divides the liquid into two bubbling regions 1 below the non-side downcomer. If the non-side downcomer in FIG. 1 adopts the structure of the hanging downcomer in the related art shown in FIG. 2, after liquid flows to a lower column tray from the bottom part of the non-side downcomer, the liquid freely and randomly flows toward the left and right sides. Because of the free and random flowing, flow distribution on the left and right sides cannot be actively controlled, resulting in large randomness and uncertainty.

The randomness and uncertainty are not beneficial to a column tray provided with a plurality of bubbling regions (as shown in FIG. 1, each column tray includes three bubbling regions). This is because a multi-bubbling region column tray can achieve ideal separation efficiency only if the ratios of the amount of liquid to the amount of gas (referred to as "liquid-gas ratios") of the bubbling regions are substantially similar to each other or the same. In addition, since the area of the bubbling regions on two sides of the non-side downcomer may be different, the amounts of gas respectively flowing through the bubbling regions on the two sides may also be different. Therefore, the efficiency of the column tray can be maximized only if the liquid in the non-side downcomer is distributed according to a proportion of gas flowing through the bubbling regions on the two sides. However, even if existing multi-bubbling region column trays presently used in the industry have adopted a hanging downcomer, they still have not achieved the function of active liquid distribution. As a result, the liquid-gas ratios of the bubbling regions on the two sides of the bottom part of a non-side downcomer cannot be guaranteed to be substantially similar to each other or be the same, leading to an efficiency loss and wastes.

SUMMARY

The present disclosure provides a multi-bubbling region column tray and a corresponding plate column, to resolve at least one of the existing technical problems.

A first aspect of the present disclosure provides a multi-bubbling region column tray, comprising at least two bubbling regions, provided with first openings for liquid and gas to be mixed and in contact with each other, and at least one non-side downcomer that comprises at least one hanging downcomer. The at least one hanging downcomer includes a bottom part that comprises one or more second openings allowing liquid to flow toward a lower left side. The bottom part further comprises one or more third openings allowing liquid to flow toward a lower right side. The bottom part of the at least one hanging downcomer is configured to separate the liquid that flows out from the one or more second openings and the liquid that flows out from the one or more third openings.

According to some embodiments of the present disclosure, a liquid-gas ratio of a bubbling region on the lower left side corresponding to the one or more second openings is the same as or substantially similar to a liquid-gas ratio of a bubbling region on the lower right side corresponding to the one or more third openings.

According to some embodiments of the present disclosure, a ratio of an area occupied by the one or more second openings to an area occupied by the one or more third openings is the same as or substantially similar to a ratio of a gas channel area of a bubbling region on the lower left side to a gas channel area of a bubbling region on the lower right side.

According to some embodiments of the present disclosure, the bottom part of the at least one hanging downcomer further comprises a flat bottom plate and a partition plate located below the bottom plate.

According to some embodiments of the present disclosure, the partition plate is perpendicular to the bottom plate and is located at a middle position below the bottom plate.

According to some embodiments of the present disclosure, the one or more second openings and the one or more third openings are provided on the bottom plate, the liquid flowing out from the one or more second openings is located on a left side of the partition plate, and the liquid flowing out from the one or more third openings is located on a right side of the partition plate.

According to some embodiments of the present disclosure, the partition plate includes a lower part that is in the proximity of or in contact with another multi-bubbling region column tray located on a lower side.

According to some embodiments of the present disclosure, the at least one hanging downcomer includes a vertical cross-section shaped as a rectangle, a trapezoid, or steps.

According to some embodiments of the present disclosure, the partition plate comprises a slot extending in a direction parallel to the bottom plate at a position that is in the proximity of the bottom plate.

According to some embodiments of the present disclosure, the bottom part of the at least one hanging downcomer further comprises a V-shaped bottom plate, and the one or more second openings and the one or more third openings are respectively located on two sides of the V-shaped bottom plate.

According to some embodiments of the present disclosure, the bottom plate is in the proximity of or in contact with another multi-bubbling region column tray located on a lower side at a tip of the V-shaped bottom plate.

According to some embodiments of the present disclosure, the bottom plate is provided with a partition plate extending in a vertical direction at a tip of the V-shaped bottom plate.

According to some embodiments of the present disclosure, a bubbling device is arranged on the bubbling regions, and the bubbling device includes at least one of a sieve, a tongue hole, a fixed valve, or a float valve.

According to some embodiments of the present disclosure, a bubble promotor located below the at least one hanging downcomer is arranged on the bubbling regions, and the bubble promotor includes a closed top part so as to allow gas to flow out only from a side surface.

According to some embodiments of the present disclosure, the respective shapes of the one or more second openings comprise at least one of the following: a circle hole, a rectangle hole, or an ellipse hole; and the respective shapes of the one or more third openings comprise at least one of the following: a circle hole, a rectangle hole, or an ellipse hole.

According to some embodiments of the present disclosure, a number and an area of the one or more second openings are determined according to a liquid distribution proportion, and a number and an area of the one or more third openings are determined according to the liquid distribution proportion.

A second aspect of the present disclosure provides a plate column that includes a column body and at least two multi-bubbling region column trays according to the first aspect of the present disclosure, where the multi-bubbling region column trays are arranged in the column body and are spaced apart from each other in a vertical direction.

According to some embodiments of the present disclosure, respective diameters of the at least two multi-bubbling region column trays, a number of bubbling devices mounted on the at least two multi-bubbling region column trays, a number and respective areas of the bubbling regions, and a number of bubbling devices and a gas channel area corresponding to each of the bubbling regions are determined according to a total gas flow on the at least two multi-bubbling region column trays, a total liquid flow on the at least two multi-bubbling region column trays, a physical property of the gas, and a physical property of the liquid.

According to some embodiments of the present disclosure, a liquid distribution proportion in each of the at least one hanging downcomer is determined according to a correspondence between the at least one hanging downcomer and the bubbling regions, and respective numbers and areas of the one or more second openings and the one or more third openings are further determined based on the liquid distribution proportion in each of the at least one hanging downcomer.

Additional aspects and advantages of the present disclosure will be given in the following description, parts of which may become apparent from the following description, or may be learned by practicing the present disclosure.

BRIEF DESCRIPTION OF THE DRAWINGS

To describe technical solutions of the present disclosure more clearly, the following briefly describes the accompanying drawings. The accompanying drawings illustrate only some embodiments of the present disclosure, and a person of ordinary skill in the art may further obtain other drawings according to these accompanying drawings.

DETAILED DESCRIPTION

Figure 1:
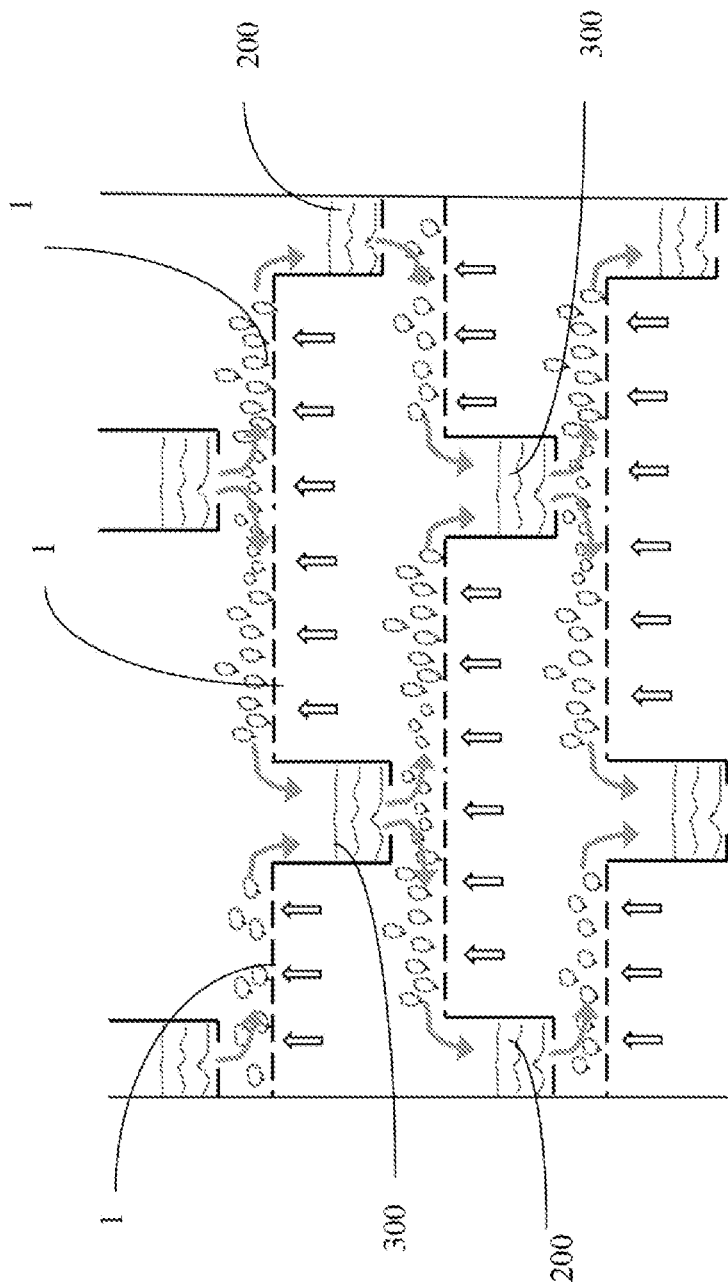
FIG. 1 is a schematic diagram illustrating the flow of gas and liquid phases of a three-overflow column tray (adopting a multi-bubbling region column tray) in related art.

The following describes the technical solutions provided in the embodiments of the present disclosure with reference to the accompanying drawings. The described embodiments are only some of the embodiments of the present disclosure and not all of the embodiments. Other embodiments that may be obtained by a person of ordinary skill in the art based on the embodiments of the present disclosure without additional creative efforts shall fall within the protection scope of the present disclosure.

In the description of the present disclosure, it should be understood that the orientation or position relationships indicated by terms such as "center", "longitudinal", "horizontal", "upper", "lower", "front", "rear", "left", "right", "top", "bottom", "inner", and "outer" are based on the orientation or position relationships shown in the accompanying drawings, and are used only for ease and brevity of illustration and description of the present disclosure, rather than indicating or implying that the mentioned apparatus or components need to have a particular orientation or need to be constructed and operated in a particular orientation. Therefore, such terms should not be construed as limiting of the present disclosure. In addition, terms such as "first", "second", and "third" are used for descriptive purposes only and should not be construed as indicating or implying relative importance or implicitly indicating the number of technical features indicated. Therefore, features defined by "first", "second", and "third" may explicitly or implicitly include one or more of the features. Also, in the description of the present disclosure, "a plurality of" means two or more, unless stated otherwise.

In the description of the present disclosure, it should be noted that, unless otherwise explicitly specified or defined, the terms such as "mount", "connect", and "connection" should be understood in a broad sense. For example, a connection may be a fixed connection, a detachable connection, or an integral connection; or a connection may be a mechanical connection or an electrical connection; or a connection may be a direct connection, an indirect connection through an intermediary, or an internal connection between two components. The specific meanings of the above terms in the present disclosure may be understood by a person of ordinary skill in the art according to specific circumstances.

In the present disclosure, unless otherwise explicitly stipulated and restricted, a first feature being "above" or "below" a second feature may include the first and second features being in direct contact, or may include the first and second features not being in direct contact but being contacted by other features therebetween. Moreover, a first feature being "over", "above", and "on" a second feature includes the first feature being directly above or obliquely above the second feature, or means that a horizontal height of the first feature is higher than that of the second feature. A first feature being "below", "under", or "underneath" a second feature includes the first feature being directly below or obliquely below the second feature, or means that a horizontal height of the first feature is lower than that of the second feature.

Exemplary Embodiment Associated with a Multi-Bubbling Region Column Tray

Figure 3:
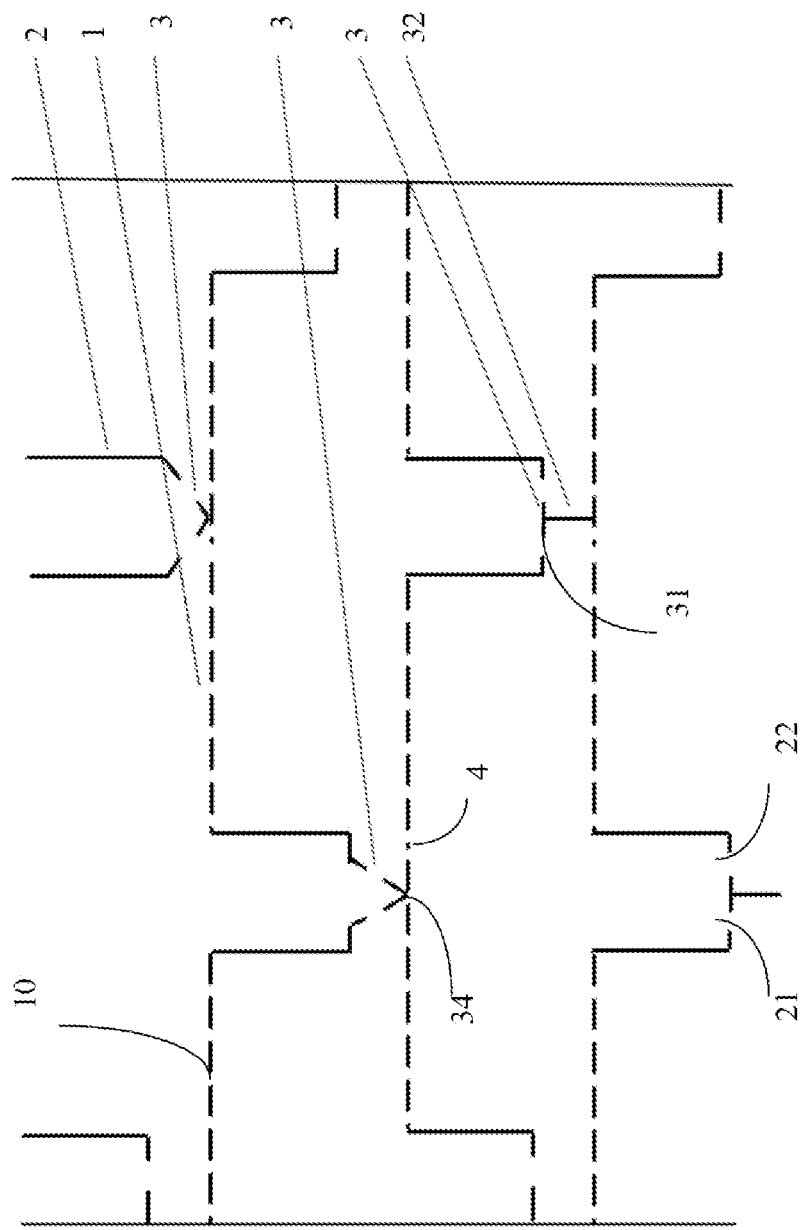
FIG. 3 is a schematic structural diagram illustrating an exemplary embodiment of a multi-bubbling region column tray according to the present disclosure.

FIG. 3 is a schematic structural diagram of an exemplary embodiment of a multi-bubbling region column tray according to the present disclosure. Referring to FIG. 3, four multi-bubbling region column trays are staggered so that liquid passing through (or flowing through) a downcomer from an upper column tray may fall onto a bubbling region on a lower column tray.

In FIG. 3, all or a subset of the multi-bubbling region column trays include at least two bubbling regions 1 (e.g., there may be two, three, or more bubbling regions) and at least one non-side downcomer (e.g., there may be one, two, or more non-side downcomers). The non-side downcomer includes at least one hanging downcomer 2 (in FIG. 3, each column tray includes a hanging downcomer 2, and the bottom parts 3 of the hanging downcomers may be structurally different, where bottom plates 31 of the two upper column trays are V-shaped, and bottom plates 31 of the two lower column trays are flat and each provided with a partition plate 32).

Preferably, all non-side downcomers may adopt the structure design of hanging downcomer 2. In this case, regions corresponding to liquid receiving trays on the multi-bubbling region column tray may be all designed as bubbling regions, to improve the processing capability of the column tray.

As shown in FIG. 3, at least two bubbling regions 1 (e.g., every bubbling region or at least subset of the bubbling regions) may be provided with first openings 10 for liquid and gas to be mixed and in contact with each other. At first openings 10, liquid and gas are mixed and in contact with each other. Gas then continues to move toward an upper column tray, while liquid flows downward from a downcomer (a side downcomer or a non-side downcomer) on another side.

In FIG. 3, bottom part 3 of hanging downcomer 2 includes one or more second openings 21 allowing liquid to flow toward a lower left side, and one or more third openings 22 allowing liquid to flow toward a lower right side. Bottom part 3 of hanging downcomer 2 is designed to separate (isolate, split, or divide) the liquid flowing out from the one or more second openings 21 and the liquid flowing out from the one or more third opening 22.

Figure 2:
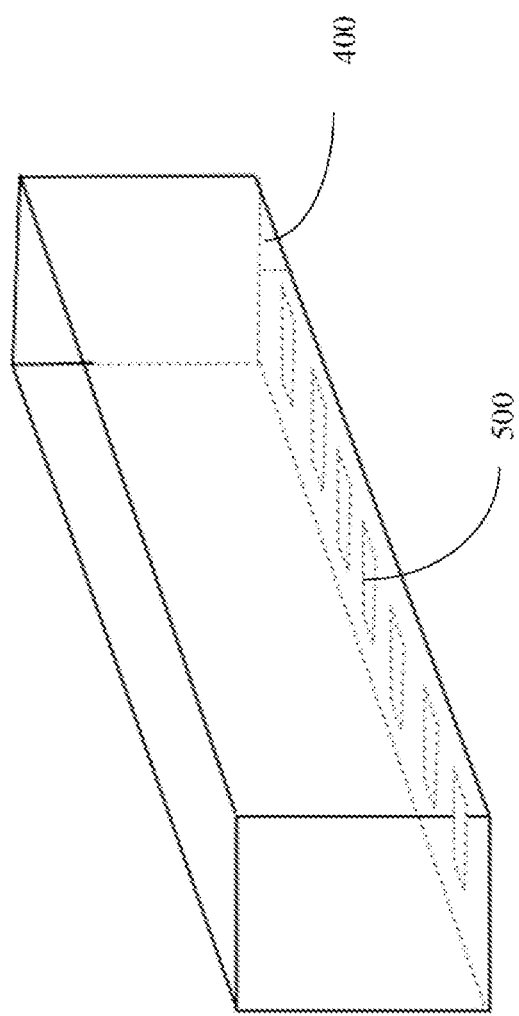
FIG. 2 is a schematic structural diagram illustrating a typical non-side downcomer (a hanging downcomer) in related art.

It may be understood that, compared with the structure (especially the bottom structure) of existing hanging downcomer 2 shown in FIG. 2, a common characteristic of hanging downcomer 2 in FIG. 3 is in that the structure design of bottom part 3 (which is described in greater detail below) allows the liquid flowing out from the one or more second openings 21 and the liquid flowing out from the one or more third opening 22 to be separated from each other (completely or substantially). In this way, the flow distribution on the left and right sides may be actively controlled, thereby preventing liquid from directly flowing downward from the bottom part and then freely and randomly flowing toward the left and right sides as in FIG. 1 (because the liquid is not separated or isolated). Therefore, the foregoing technical solution provided by the present disclosure may avoid the problem where the flow distribution on the left and right sides cannot be actively controlled if liquid freely and randomly flows toward the left and right sides as in the related art.

According to some embodiments of the present disclosure, a liquid-gas ratio (namely, a ratio of the amount of liquid to the amount of gas) of a bubbling region on the lower left side corresponding to the one or more second openings 21 is the same as or substantially similar to (e.g., if an absolute value of a difference between two liquid-gas ratios is less than 10%, the liquid-gas ratios may be considered substantially similar in this case) as a liquid-gas ratio of a bubbling region on the lower right side corresponding to the one or more third opening 22.

It may be understood that, if the liquid-gas ratio of the bubbling region on the lower left side corresponding to the one or more second openings 21 is substantially similar to or the same as the liquid-gas ratio of the bubbling region on the lower right side corresponding to the one or more third openings 22, the multi-bubbling region column tray according to the embodiments of the present disclosure may achieve ideal separation efficiency, thereby avoiding efficiency losses and wastes.

According to some embodiments of the present disclosure, a ratio of an area (also referred to as an "opening area") occupied by the one or more second openings 21 to an area (also referred to as an "opening area") occupied by the one or more third openings 22 is substantially similar to (e.g., if an absolute value of a difference between two ratios is less than 10%, the ratios may be considered substantially similar in this case) or the same as a ratio of a gas channel area of the bubbling region on the lower left side to a gas channel area of the bubbling region on the lower right side. The "gas channel area" in the embodiments of the present disclosure refers to an area of a gas channel corresponding to a bubbling device on the bubbling region.

It may be understood that, if the ratio of the area occupied by the two or more second openings 21 to the area occupied by the one or more third openings 22 is substantially similar to or the same as the ratio of the gas channel area of the bubbling region on the lower left side to the gas channel area of the bubbling region on the lower right side, the liquid-gas ratio of the bubbling region on the lower left side corresponding to the one or more second openings 21 may be substantially to or the same as the liquid-gas ratio of the bubbling region on the lower right side corresponding to the one or more third openings 22. For example, the respective areas of the bubbling regions on two sides of the non-side downcomer (adopting the structure of hanging downcomer 2) may be different. In this case, the amounts of gas respectively flowing through the bubbling regions on the two sides may also be different. According to the foregoing technical solution, the efficiency of the column tray may be maximized if the liquid in the non-side downcomer is distributed according to a proportion of the amount of gas flowing through the bubbling regions on the two sides. For example, in a propylene column, the efficiency may be increased by 5% to 20% if the multi-bubbling region column tray according to the embodiments of the present disclosure is adopted.

Example 1 to Example 4

FIG. 4 to FIG. 7 show a plurality of examples meeting the design requirements of bottom part 3 of hanging downcomer 2 of the present disclosure. A common characteristic of these examples is that bottom part 3 of hanging downcomer 2 includes a flat bottom plate 31 and a partition plate 32 located below bottom plate 31.

According to some embodiments of the present disclosure, the one or more second openings 21 and the one or more third openings 22 are provided on bottom plate 31, the liquid flowing out from the one or more second openings 21 is located on a left side of partition plate 32, and the liquid flowing out from the one or more third openings 22 is located on a right side of partition plate 32.

It may be understood that, by adopting the structure of flat bottom plate 31 and partition plate 32 located below bottom plate 31, the flow distribution on the left and right sides may be actively controlled through the structure of partition plate 32, thereby preventing liquid from directly flowing downward from the bottom part and freely and randomly flowing toward the left and right sides as in FIG. 1 (because the liquid there is not separated or isolated).

For example, an angle between partition plate 32 and an upright direction (also referred to as a "vertical direction") may be less than 45°. Preferably, partition plate 32 is perpendicular to bottom plate 31 and is located at a middle position below bottom plate 31. By adopting this structure, the entire structure may be more symmetrical and coordinated, and easy to design and manufacture. In addition, because partition plate 32 adopts a design of being perpendicular to the bottom plate and located at a middle position, it is easy to calculate and simulate flowing states of the liquid on the left and right sides.

Preferably, partition plate 32 has a lower part which is in the proximity of another multi-bubbling region column tray located on a lower side (e.g., even if there is a distance or gap, the distance or gap does not exceed 20 mm, or a ratio of the distance or gap to a vertical height of the partition plate does not exceed 20%) or in contact with the other multi-bubbling region column tray located on the lower side. If the lower part of partition plate 32 is in contact with the other multi-bubbling region column tray located on the lower side, an optimal effect of separating liquid on two sides may be achieved, which better helps with actively controlling the flow distribution on the left and right sides. If the lower part of partition plate 32 is in the proximity of the other multi-bubbling region column tray located on the lower side, the flows on the left and right sides may still be distributed because the distance between the lower part of partition plate 32 and the other multi-bubbling regions column tray is relatively small, so interference between the liquid on the left side and the liquid on the right side is also relatively small (which may be negligible).

Figure 4:
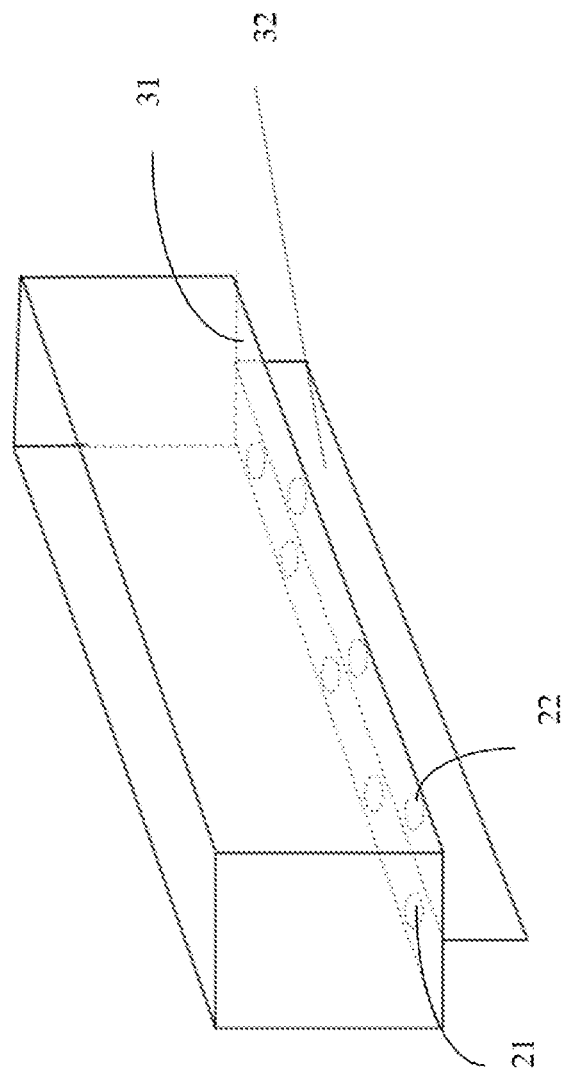
FIG. 4 is a schematic structural diagram illustrating a bottom part of a hanging downcomer according to example 1 of the present disclosure.

As shown in FIG. 4, hanging downcomer 2 has a vertical cross-section (a cross-section of partition plate 32 is omitted in this case), which may be in the shape of a rectangle (marked as "example 1"). For example, the angle between partition plate 32 and the vertical direction in FIG. 4 may be 10°, and the vertical height of partition plate 32 may be 100 mm.

Figure 5:
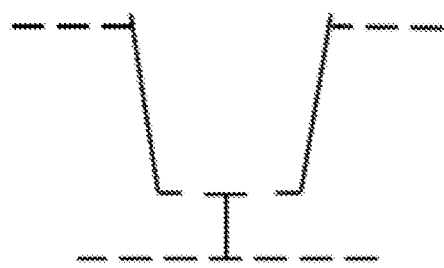
FIG. 5 is a schematic structural diagram illustrating a bottom part of a hanging downcomer according to example 2 of the present disclosure.
Figure 6:
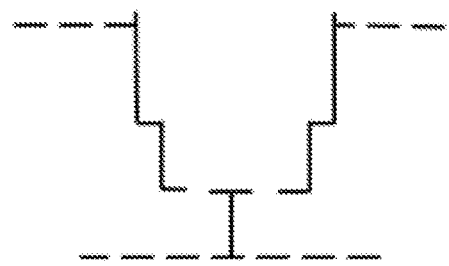
FIG. 6 is a schematic structural diagram illustrating a bottom part of a hanging downcomer according to example 3 of the present disclosure.

In a variant embodiment, the vertical cross-section of hanging downcomer 2 may alternatively be in the shape of a trapezoid (as shown in FIG. 5, which is marked as "example 2") or steps (as shown in FIG. 6, which is marked as "example 3"), or may be in another suitable shape. The flows on the left and right sides may be distributed by adopting the above shapes for the cross-sections of hanging downcomers 2 and having the structure design of partition plate 32.

Figure 7:
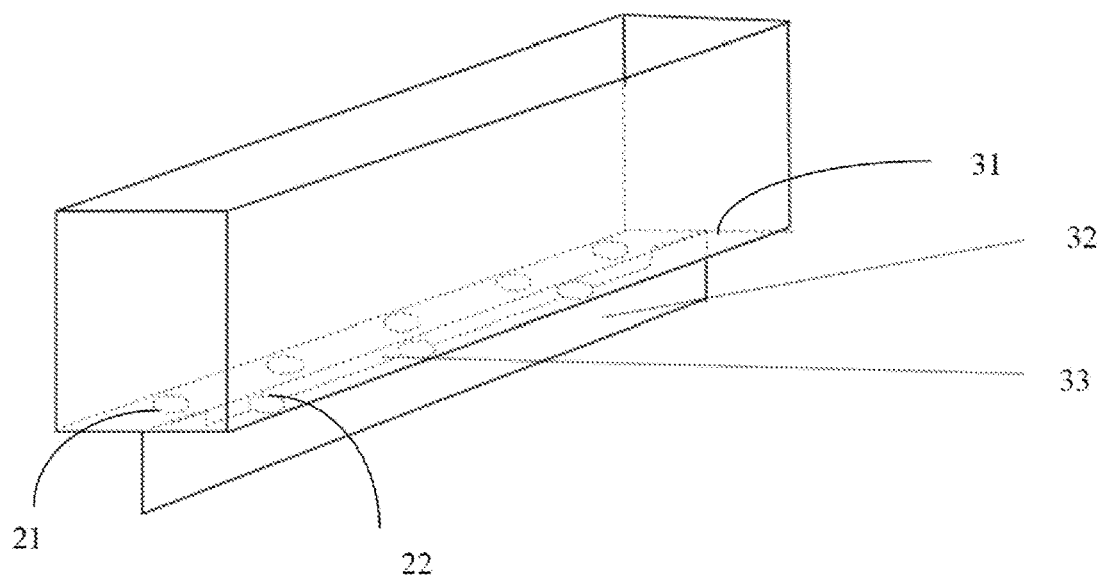
FIG. 7 is a schematic structural diagram illustrating a bottom part of a hanging downcomer according to example 4 of the present disclosure.

FIG. 7 shows another variant embodiment (which is marked as "example 4"). Different from the example in FIG. 4, partition plate 32 (e.g., which may have a vertical height of 150 mm) includes a slot 33 (e.g., which may have a vertical width of 30 mm or a ratio of the vertical width to the vertical height of partition plate 32 not exceeding 20%) extending in a direction parallel to the bottom plate at a position close to bottom plate 31. Preferably, a position of a lower edge of slot 33 is higher than a liquid level at the position, so that the liquid on the left and right sides is separated. By adopting such a design for slot 33, gas phase pressures on two sides of partition plate 32 may be balanced, thereby avoiding the impact on liquid distribution on the two sides when the gas phase pressures on the two sides of the partition plate are different.

Example 5 to Example 8

FIG. 8 to FIG. 11 show a plurality of examples meeting the design requirements of bottom part 3 of hanging downcomer 2 of the present disclosure. A common characteristic of these examples is that bottom part 3 of hanging downcomer 2 includes a V-shaped bottom plate 31, and the one or more second openings 21 and the one or more third openings 22 are respectively located on two sides of the V-shaped bottom plate.

For example, a vertical height of the V-shaped structure may range from 50 mm to 500 mm. An angle of the V-shaped structure may range from 30° to 150°. A ratio of the width of an upper edge of the V-shaped structure to the horizontal width of the bottom plate may range from 0.2 to 0.8.

It may be understood that, after V-shaped bottom plate 31 is adopted, partition plate 32 may be omitted. In this case, because the one or more second openings 21 and the one or more third openings 22 are respectively located on two sides of the V-shaped bottom plate, the flow distribution on the left and right sides may be actively controlled by using the V-shaped structure.

Preferably, at a V-shaped tip 34 of bottom plate 31, bottom plate 31 is in the proximity of another multi-bubbling region column tray 4 located on a lower side (e.g., even if there is a distance or gap, the distance or gap does not exceed 30 mm, or the distance or gap does not exceed 10% of a gap between two column trays), or in contact with the other multi-bubbling region column tray 4 located on the lower side. If, at V-shaped tip 34, bottom plate 31 is in contact with the other multi-bubbling region column tray located on the lower side, an optimal effect of separating liquid on two sides may be achieved, which better helps with actively controlling the flow distribution on the left and right sides. If, at V-shaped tip 34, bottom plate 31 is in the proximity of the other multi-bubbling region column tray located on the lower side, the flows on the left and right sides may still be distributed because the distance between bottom plate 31 and the multi-bubbling region column tray 4 located on the lower side is relatively short, so interference between the liquid on the left side and the liquid on the right side is also relatively small (which may be negligible).

Figure 8:
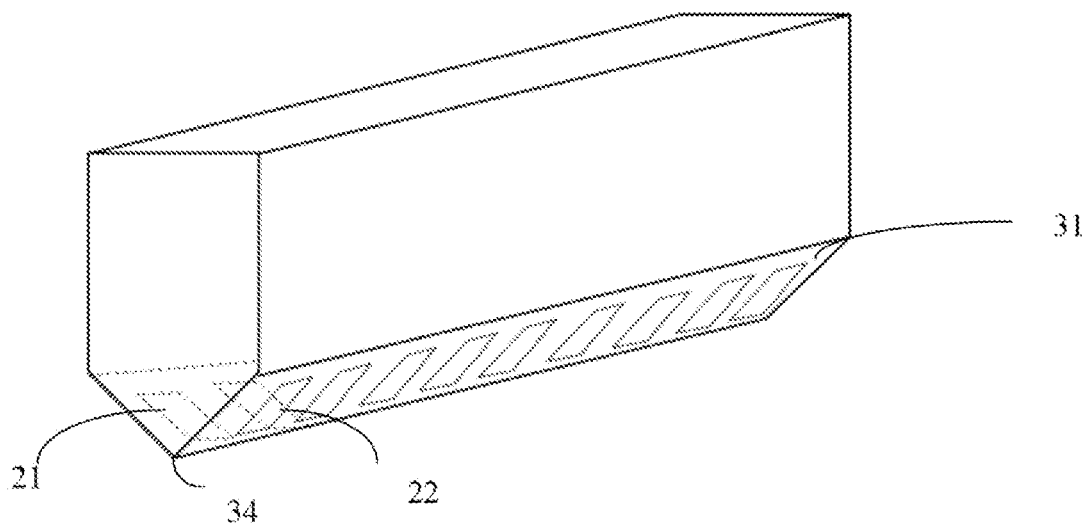
FIG. 8 is a schematic structural diagram illustrating a bottom part of a hanging downcomer according to example 5 of the present disclosure.

FIG. 8 shows an example in which the shape of a cross-section of the part above bottom part 3 of hanging downcomer 2 is a rectangle (which is marked as "example 5") and bottom plate 31 is V-shaped. For example, the vertical height of the V-shaped structure may be 150 mm, and the angle of the V-shaped structure may be 120°.

Figure 9:
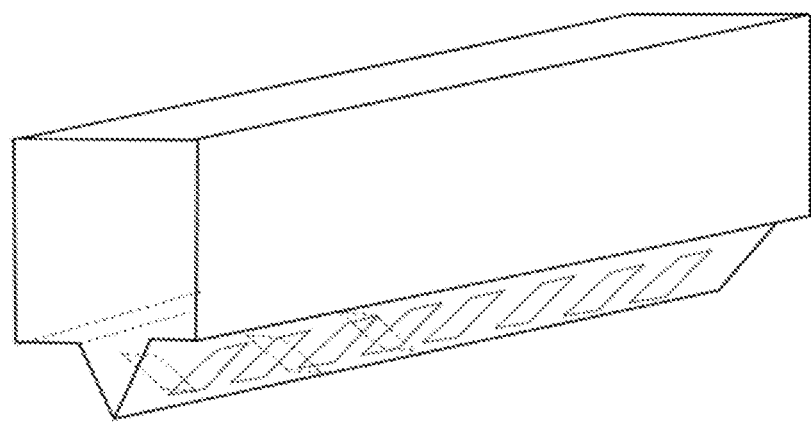
FIG. 9 is a schematic structural diagram illustrating a bottom part of a hanging downcomer according to example 6 of the present disclosure.

In a variant embodiment, a difference between the example in FIG. 9 (which is marked as "example 6") and the example in FIG. 8 lies in that, a part of bottom plate 31 in FIG. 9 is flat while another part is V-shaped (e.g., the vertical height of the V-shaped structure may be 200 mm, the angle of the V-shaped structure may be 45°, and the ratio of the width of the upper edge of the V-shaped structure to the horizontal width of the bottom plate may be 0.8). The two examples shown in FIG. 8 and FIG. 9 both belong to the case in which bottom plate 31 is V-shaped.

Figure 10:
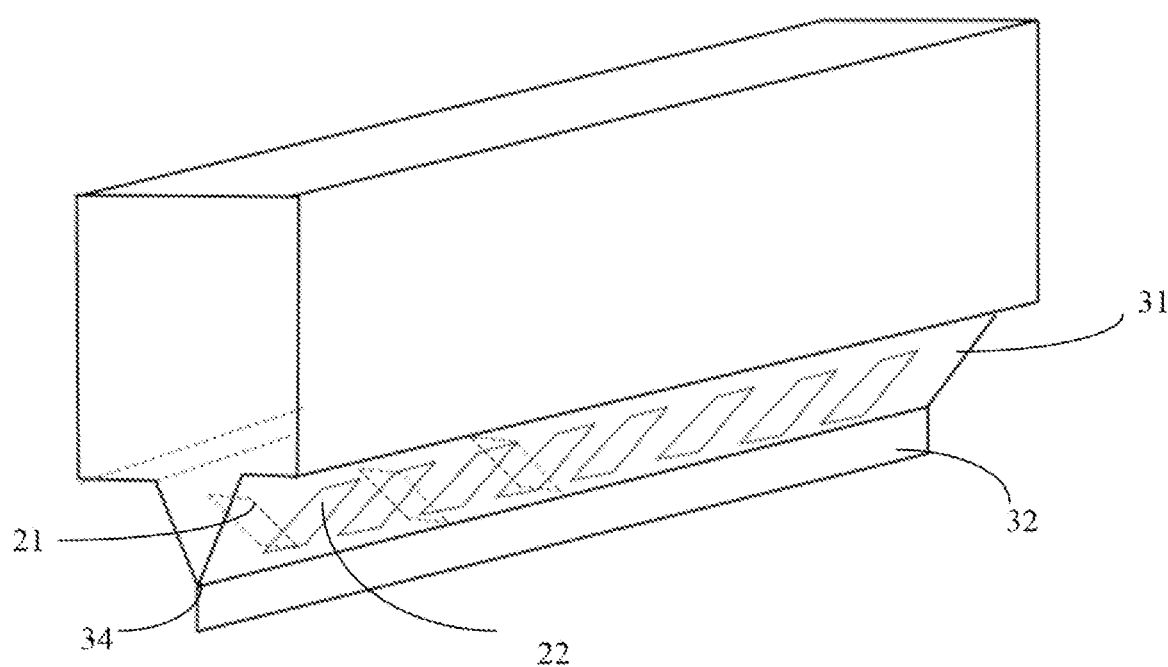
FIG. 10 is a schematic structural diagram illustrating a bottom part of a hanging downcomer according to example 7 of the present disclosure.

A difference between the example in FIG. 10 (which is marked as "example 7") and the example in FIG. 9 lies in that, bottom plate 31 of FIG. 10 is provided with a partition plate 32 (e.g., a height of partition plate 32 may be 70 mm) extending in an upright direction (also referred to as a "vertical direction") at V-shaped tip 34 of the bottom plate. Due to the combined effect of the V-shaped bottom plate 31 and partition plate 32 (e.g., the ratio of the width of the upper edge of the V-shaped structure to the horizontal width of the bottom plate may be 0.4, the vertical height of the V-shaped structure may be 120 mm, and the angle of the V-shaped structure may be 60°), the flow distribution on the left and right sides may also be actively controlled.

Figure 11:
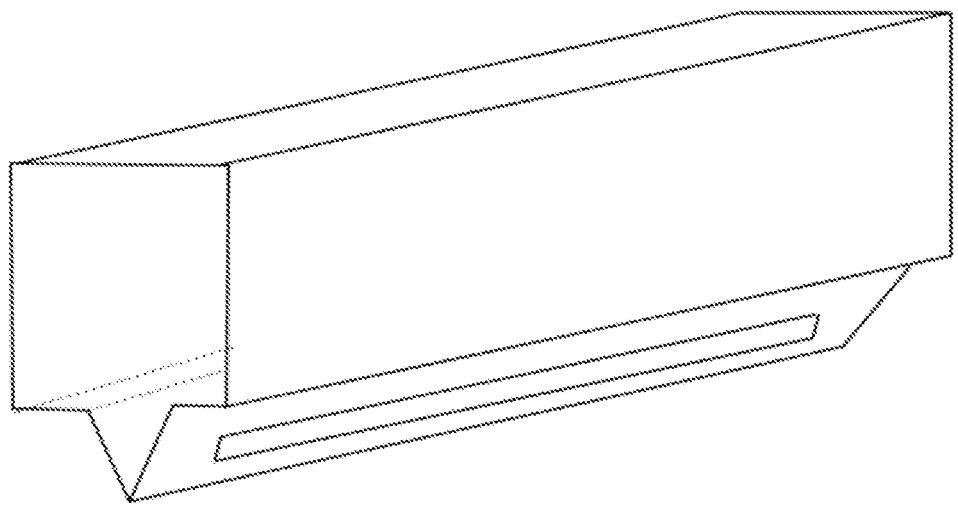
FIG. 11 is a schematic structural diagram illustrating a bottom part of a hanging downcomer according to example 8 of the present disclosure.

A difference between the example in FIG. 11 (which is marked as "example 8") and the example in FIG. 9 lies in that, the one or more second openings and the one or more third openings each adopt an elongated large opening rather than a plurality of small openings. For example, the ratio of the width of the upper edge of the V-shaped structure to the horizontal width of the bottom plate may be 0.5, the vertical height of the V-shaped structure may be 150 mm, and the angle of the V-shaped structure may be 30°. In comparison, by having the one or more second openings and the one or more third openings in the form of a plurality of openings, the number and area of the opening(s) may be set more flexibly, and the flow distribution on the left and right sides may be controlled more conveniently.

According to some embodiments of the present disclosure, a bubbling device is arranged on bubbling regions 1, and the bubbling device includes at least one (one or more) of the following: a sieve, a tongue hole, a fixed valve, or a float valve. Using the at least one bubbling device, liquid and gas may contact and mix with each other more conveniently.

According to some embodiments of the present disclosure, a bubble promotor located below the hanging downcomer is arranged on bubbling regions 1, and the bubble promotor has a closed top part so as to allow gas to flow out only from a side surface. The bubble promotor is generally arranged directly below the hanging downcomer, and if a common bubbling device (e.g., a sieve, a tongue hole, a fixed valve, or a float valve) is arranged at the position, some liquid directly leaks to a lower column tray (without flowing through the bubbling region and making contact with the gas), thereby affecting the efficiency of the column tray. This may be avoided by arranging an independent bubble promotor at the position to improve the efficiency of the column tray.

According to some embodiments of the present disclosure, the shape(s) of the one or more second openings 21 includes at least one of the following: a circle hole, a rectangle hole, or an ellipse hole; and the shape(s) of the one or more third openings 22 includes at least one of the following: a circle hole, a rectangle hole, or an ellipse hole. In an alternative embodiment, the shape(s) of the one or more second openings 21 and the shapes of the one or more third openings 22 may alternatively include other feasible shapes, which are not limited herein. For example, it is conceivable to those skilled in the art that the one or more second openings 21 and the one or more third openings 22 may alternatively have other irregular shapes such as a shape formed by having semi-circles on two sides and a rectangle in the middle, which may be referred to as an "oblong hole."

According to some embodiments of the present disclosure, the number of and the area occupied by the one or more second openings 21 are determined according to a liquid distribution proportion, and the number of and the area occupied by the one or more third openings 22 are also determined according to the liquid distribution proportion. For example, according to a liquid distribution proportion on the column tray (especially a liquid distribution proportion in each hanging downcomer), the number of and the area occupied by the one or more second openings 21 and the number of and the area occupied by the one or more third openings 22 may be calculated, so that the liquid distribution on the left and right sides is actively controlled.

Exemplary Embodiment about a Plate Column

The present disclosure further provides an exemplary embodiment of a plate column, including: a column body; and at least two multi-bubbling region column trays according to the above exemplary embodiments of the present disclosure, where the multi-bubbling region column trays are arranged in the column body and are spaced apart from each other in a vertical direction ("spaced apart" may mean that two column trays are arranged in a vertical direction, which does not exclude the case in which the two column trays are in contact with each other at bottom part 3 of hanging downcomer 2).

According to some embodiments of the present disclosure, respective diameters of the multi-bubbling region column trays, the number of bubbling devices mounted on the multi-bubbling region column trays, the number and respective areas of bubbling regions 1, and the number of bubbling devices and a gas channel area corresponding to each bubbling region are determined according to a total gas flow on the multi-bubbling region column trays, a total liquid flow on the multi-bubbling region column trays, one or more physical properties (including density and viscosity) of the gas, and one or more physical properties of the liquid.

For example, in a design of the plate column and the multi-bubbling region column tray, the diameter of the column tray, the number of bubbling regions on the column tray, and the total number of bubbling devices (such as float valves, fixed valves, and sieves) are calculated according to the total gas flow, the total liquid flow, the one or more physical properties (density, viscosity, and the like) of the gas, and the one or more physical properties of the liquid. The total number of bubbling devices also determines the total gas channel area. In addition, the area of each bubbling region may be calculated according to the diameter of the multi-bubbling region column tray and the number of bubbling regions. Generally, since the bubbling devices may be uniformly distributed in the bubbling regions, the number of bubbling devices in each bubbling region and the gas channel area of each bubbling region may be calculated.

According to some embodiments of the present disclosure, a liquid distribution proportion (which may be a distribution proportion between the liquid on the left side of a hanging downcomer and the liquid on the right side of the hanging downcomer) in each hanging downcomer is determined according to a correspondence between hanging downcomer 2 and bubbling region 1; and the respective numbers and areas of the one or more second openings 21 and the one or more third openings 22 are further determined.

For example, the gas channel area of the bubbling region corresponding to each downcomer may be determined according to the correspondence between the downcomer and the bubbling region. The total liquid amount is distributed into downcomers according to a proportion of the gas channel areas by using a liquid distributor (e.g., a device located at an uppermost position of the plate column and configured to introduce and distribute liquid), so that the liquid flow in each downcomer is obtained. The number and the area of the openings on the left and right sides of the bottom plate of the downcomer are then determined according to the liquid flow in each downcomer and a distribution proportion between the liquid on the left side of the downcomer and the right side of the downcomer.

Figure 12:
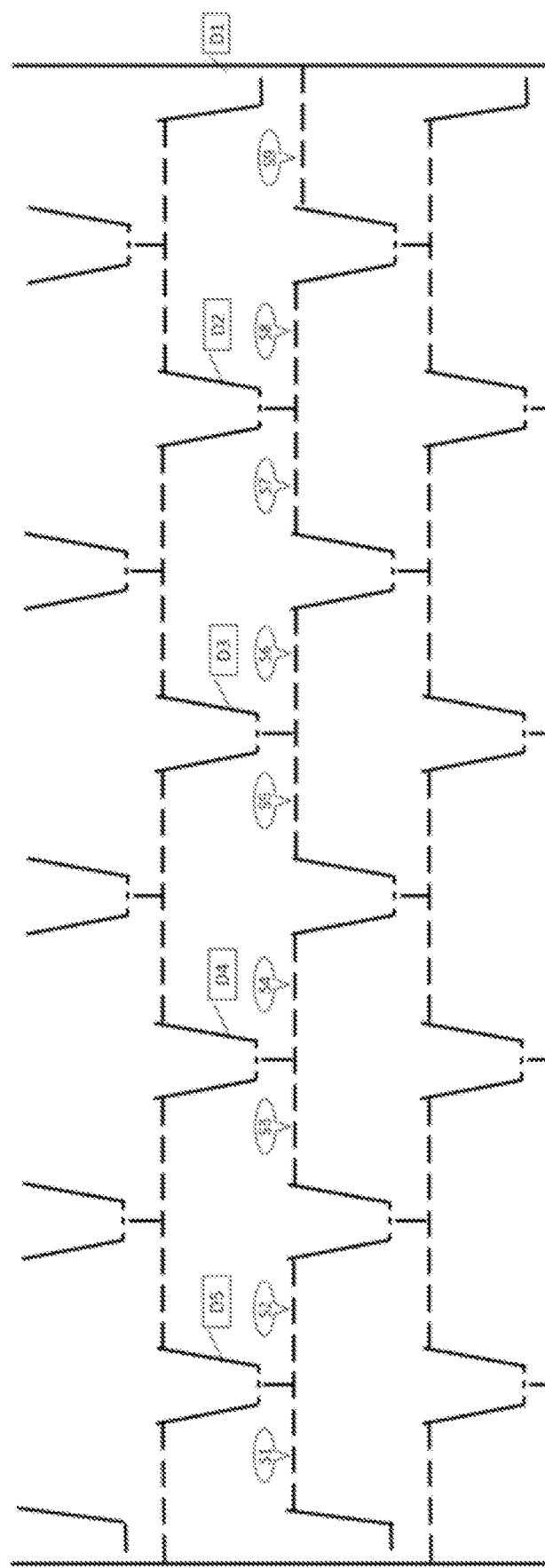
FIG. 12 is a schematic structural diagram illustrating an exemplary embodiment of a multi-bubbling region column tray that may be included in a plate column according to the present disclosure.

FIG. 12 is a schematic structural diagram of an exemplary embodiment of a multi-bubbling region column tray for a plate column according to the present disclosure. For example, during design of the plate column and the multi-bubbling region column tray, the total liquid flow on the multi-bubbling region column tray, the total gas flow on the column tray, one or more physical properties (density, viscosity, and the like) of the gas, and one or more physical properties of the liquid may be first determined and provided as input to the design of the column tray.

The diameter of the column tray, the number of bubbling regions, and the total number of bubbling devices (such as float valves, fixed valves, and sieves) are calculated according to the total gas flow, the total liquid flow, the one or more physical properties (density, viscosity, and the like) of the gas, and the one or more physical properties of the liquid, and the total number of bubbling devices also decides the total of gas channel area.

Then, the area of each bubbling region may be calculated according to the diameter of the column tray and the number of bubbling regions. Because the bubbling devices are uniformly distributed in the bubbling regions, the number of bubbling devices in each bubbling region and the gas channel area of each bubbling region may be calculated and used to obtain the data in the first three rows of Table 1 below.

Then, the gas channel area of the bubbling region corresponding to each downcomer may be determined according to the correspondence between the downcomer and the bubbling region. In FIG. 12, D1 corresponds to S9, D2 corresponds to S7+S8, D3 corresponds to S5+S6, D4 corresponds to S3+S4, and D5 corresponds to S1+S2 (the fourth row in Table 1). The total liquid amount is distributed into downcomers according to a proportion of the gas channel areas by using a liquid distributor, so that the liquid flow in each downcomer is obtained.

The number and area (the fifth and sixth rows in Table 1) of the openings on the bottom plate of the downcomer are determined according to the liquid flow in each downcomer.

Compared with related art, a design provided by the present disclosure arranges the openings on the bottom plate on the left and right sides and separate the openings using a V-shaped structure or a partition plate at a middle position. A design objective to be achieved is to cause a ratio R1 (the seventh row in Table 1) between the areas of the openings on two sides to be substantially similar to (as shown in the ninth row of Table 1, a difference between R1 and R2 is within 10%, and R1 and R2 may be considered "substantially similar" in this case) or the same as a ratio R2 (the eighth row in Table 1) between the gas channel areas of the bubbling regions on the left and right sides of a lower column tray.

TABLE 1

Structure parameters of bubbling regions and downcomers

| (1) Serial number of the bubbling region | S1 | S2 | S3 | S4 | S5 | S6 | S7 | S8 | S9 |
|---|---|---|---|---|---|---|---|---|---|
| (2) The number of fixed valves | 658 | 890 | 1071 | 1140 | 1166 | 1149 | 1052 | 924 | 672 |
| (3) Gas channel area (m$^2$) | 0.583 | 0.788 | 0.948 | 1.010 | 1.033 | 1.018 | 0.932 | 0.818 | 0.595 |
| (4) Position of a corresponding downcomer | D5 Left | D5 Right | D4 Left | D4 Right | D3 Left | D3 Right | D2 Left | D2 Right | |
| (5) The number of openings on a bottom plate of the downcomer | 104 | 141 | 180 | 195 | 178 | 176 | 166 | 145 | |
| (6) Opening area (m$^2$) | 0.166 | 0.226 | 0.288 | 0.312 | 0.285 | 0.282 | 0.266 | 0.232 | |
| (7) Ratio R1 between opening area on left and right sides of the bottom plate | 0.738 | | 0.923 | | 1.011 | | 1.145 | | |
| (8) Ratio R2 between gas channel area of bubbling regions on left and right sides | 0.740 | | 0.939 | | 1.015 | | 1.139 | | |
| (9) Relative error (R1 − R2)/R2 * 100% | −0.27% | | −1.70% | | −0.39% | | 0.53% | | |

According to the description of the foregoing implementations, a person skilled in the art may clearly understand that the present disclosure may alternatively be implemented using other structures, and features of the present disclosure are not limited to the foregoing exemplary embodiments. Any change or modification conceived by a person skilled in the art within the technical scope of the present disclosure shall fall within the protection scope of the present disclosure.

What is claimed is:

1. A multi-bubbling region column tray, comprising:
   at least two bubbling regions provided with first openings for liquid and gas to be mixed; and
   at least one non-side downcomer that comprises at least one hanging downcomer, wherein:
      the at least one hanging downcomer includes one or more second openings and one or more third openings, the one or more second openings configured to allow liquid to flow toward a first bubbling region located at a first lower side of the at least one hanging downcomer, the one or more third openings configured to allow liquid to flow toward a second bubbling region located at a second lower side of the at least one hanging downcomer;
      the at least one hanging downcomer is configured to separate the liquid that flows out from the one or more second openings and the liquid that flows out from the one or more third openings; and
      a ratio of an area occupied by the one or more second openings to an area occupied by the one or more third openings is substantially similar to a ratio of a gas channel area of the first bubbling region to a gas channel area of the second bubbling region.

2. The multi-bubbling region column tray of claim 1, wherein the at least one hanging downcomer comprises a flat bottom plate and wherein the one or more second openings and the one or more third openings are provided on the flat bottom plate.

3. The multi-bubbling region column tray of claim 2, wherein the at least one hanging downcomer further comprises a partition plate located perpendicularly to the flat bottom plate and at a middle position below the flat bottom plate.

4. The multi-bubbling region column tray of claim 3, wherein the partition plate is configured so as to allow the liquid to flow out from the one or more second openings on a first side of the partition plate and flow out from the one or more third openings on a second side of the partition plate.

5. The multi-bubbling region column tray of claim 3, wherein the partition plate includes a lower part that is in the proximity of or in contact with another multi-bubbling region column tray located on a lower side of the partition plate.

6. The multi-bubbling region column tray of claim 3, wherein the partition plate comprises a slot extending in a direction parallel to the flat bottom plate at a position that is in the proximity of the flat bottom plate.

7. The multi-bubbling region column tray of claim 1, wherein a vertical cross-section of the at least one hanging downcomer is shaped as a rectangle, a trapezoid, or steps.

8. The multi-bubbling region column tray of claim 1, wherein the at least one hanging downcomer comprises a V-shaped bottom plate, and the one or more second openings and the one or more third openings are respectively located on two opposing sides of the V-shaped bottom plate.

9. The multi-bubbling region column tray of claim 8, wherein a tip of the V-shaped bottom plate is in the proximity of or in contact with another multi-bubbling region column tray located on a lower side of the V-shaped bottom plate.

10. The multi-bubbling region column tray of claim 8, wherein the V-shaped bottom plate is provided with a partition plate extending in a vertical direction at a tip of the V-shaped bottom plate.

11. The multi-bubbling region column tray of claim 1, further comprising a bubbling device, wherein the bubbling device comprises at least one of a sieve, a tongue hole, a fixed valve, or a float valve.

12. A hanging downcomer configured to be installed as a part of a multi-bubbling region column tray, the hanging downcomer comprising:
- a first set of one or more openings configured to allow liquid to flow toward a first bubbling region of the multi-bubbling region column tray, wherein the first bubbling region is located at a first lower side of the hanging downcomer; and
- a second set of one or more openings configured to allow flow toward a second bubbling region of the multi-bubbling region column tray, wherein the second bubbling region is located at a second lower side of the hanging downcomer;
- wherein the first set of one or more openings and the second set of one or more openings are configured such that a ratio of an area occupied by the first set of one or more openings to an area occupied by the second set of one or more openings is substantially similar to a ratio of a gas channel area of the first bubbling region to a gas channel area of the second bubbling region.

13. The hanging downcomer of claim 12, further comprising a flat bottom plate, wherein the first set of one or more openings and the second set of one or more openings are provided on the flat bottom plate.

14. The hanging downcomer of claim 13, further comprising a partition plate located below the flat bottom plate, wherein the partition plate is perpendicular to the flat bottom plate and located at a middle position below the flat bottom plate.

15. The hanging downcomer of claim 14, wherein the partition plate is configured so as to allow the liquid to flow out from the first set of one or more openings on a first side of the partition plate and flow out from the second set of one or more openings on a second side of the partition plate.

16. The hanging downcomer of claim 14, wherein the partition plate includes a lower part configured to be located in the proximity of or in contact with another multi-bubbling region column tray located on a lower side of the partition plate.

17. The hanging downcomer of claim 14, wherein the partition plate includes a slot extending in a direction parallel to the flat bottom plate at a position that is in the proximity of the flat bottom plate.

18. The hanging downcomer of claim 12, wherein a vertical cross-section of the hanging downcomer is shaped as a rectangle, a trapezoid, or steps.

19. The hanging downcomer of claim 12, further comprising a V-shaped bottom plate, wherein the first set of one or more openings and the second set of one or more openings are respectively located on two opposing sides of the V-shaped bottom plate.

20. The hanging downcomer of claim 19, wherein a tip of the V-shaped bottom plate is configured to be located in the proximity of or in contact with another multi-bubbling region column tray configured to be located on a lower side of the V-shaped bottom plate.

21. The hanging downcomer of claim 19, wherein the V-shaped bottom plate is provided with a partition plate extending in a vertical direction at a tip of the V-shaped bottom plate.

* * * * *